(12) United States Patent
Mazzola et al.

(10) Patent No.: US 11,999,139 B2
(45) Date of Patent: Jun. 4, 2024

(54) MULTILAYER THERMOPLASTIC FILM WITH IMPROVED PUNCTURE RESISTANCE PERFORMANCE

(71) Applicant: Dow Global Technologies LLC, Midland, MI (US)

(72) Inventors: Nicolas Cardoso Mazzola, Jundiai (BR); Sanjib Biswas, Pearland, TX (US); Jacquelyn A. deGroot, Sugar Land, TX (US); David T. Gillespie, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 432 days.

(21) Appl. No.: 17/264,390

(22) PCT Filed: Aug. 20, 2019

(86) PCT No.: PCT/US2019/047143
§ 371 (c)(1),
(2) Date: Jan. 29, 2021

(87) PCT Pub. No.: WO2020/041233
PCT Pub. Date: Feb. 27, 2020

(65) Prior Publication Data
US 2022/0266574 A1    Aug. 25, 2022

Related U.S. Application Data

(60) Provisional application No. 62/719,842, filed on Aug. 20, 2018.

(51) Int. Cl.
| | | |
|---|---|---|
| *B29C 48/10* | (2019.01) | |
| *B29C 48/00* | (2019.01) | |
| *B29C 55/28* | (2006.01) | |
| *B29D 7/01* | (2006.01) | |
| *B32B 7/12* | (2006.01) | |
| *B32B 27/08* | (2006.01) | |
| *B32B 27/30* | (2006.01) | |
| *B32B 27/32* | (2006.01) | |
| *B29K 23/00* | (2006.01) | |
| *B29K 105/02* | (2006.01) | |
| *B29L 31/00* | (2006.01) | |

(52) U.S. Cl.
CPC .......... *B32B 27/08* (2013.01); *B29C 48/0018* (2019.02); *B29C 48/10* (2019.02); *B29C 55/28* (2013.01); *B29D 7/01* (2013.01); *B32B 7/12* (2013.01); *B32B 27/306* (2013.01); *B32B 27/32* (2013.01); *B29K 2023/0616* (2013.01); *B29K 2105/02* (2013.01); *B29L 2031/712* (2013.01); *B32B 2250/24* (2013.01); *B32B 2270/00* (2013.01); *B32B 2307/518* (2013.01); *B32B 2307/581* (2013.01); *B32B 2307/72* (2013.01); *B32B 2307/7244* (2013.01); *B32B 2307/736* (2013.01); *B32B 2439/70* (2013.01)

(58) Field of Classification Search
None
See application file for complete search history.

(56) References Cited

U.S. PATENT DOCUMENTS

| | | |
|---|---|---|
| 4,597,920 A | 7/1986 | Golike |
| 4,863,769 A | 9/1989 | Lustig et al. |
| 4,976,898 A | 12/1990 | Lustig et al. |
| 4,985,197 A | 1/1991 | Isozaki et al. |
| 5,032,463 A | 7/1991 | Smith |
| 5,272,016 A | 12/1993 | Ralph |
| 5,397,613 A | 3/1995 | Georgelos |
| 5,562,958 A * | 10/1996 | Walton ................ C08L 23/04 |
| | | 428/354 |
| 5,604,043 A | 2/1997 | Ahlgren |
| 5,707,751 A | 1/1998 | Garza et al. |
| 6,437,064 B1 | 8/2002 | Eckstein et al. |
| 9,926,441 B2 | 3/2018 | Jian et al. |
| 10,703,869 B2 | 7/2020 | Jian et al. |
| 2009/0192270 A1 | 7/2009 | Malakoff et al. |
| 2015/0210840 A1 | 7/2015 | Mridula et al. |
| 2016/0059510 A1 | 3/2016 | Brunner et al. |

FOREIGN PATENT DOCUMENTS

| | | |
|---|---|---|
| EP | 0587502 | 3/1994 |
| EP | 2580279 B1 | 1/2019 |
| JP | H07309962 A | 5/1997 |
| JP | H0994933 A | 10/1998 |
| JP | 2014200968 A | 10/2014 |

OTHER PUBLICATIONS

International Preliminary Report on Patentability for related PCT Application PCT/US2019/047143, dated Mar. 4, 2021 (7 pgs).
International Search Report & Written Opinion for related PCT Application PCT/US2019/047143, dated Nov. 11, 2019 (10 pgs).

* cited by examiner

*Primary Examiner* — Sheeba Ahmed
(74) *Attorney, Agent, or Firm* — Brooks, Cameron & Huebsch, PLLC

(57) ABSTRACT

The present disclosure provides for a heat-shrinkable, biaxially stretched, multilayer thermoplastic film that includes at least a puncture resistant layer. The puncture resistant layer is formed with a polyethylene based plastomer having a density of 0.890 g/cm$^3$ to 0.910 g/cm$^3$ as measured in accordance with ASTM D-792, and a melt index (MI) as measured by ASTM D-1238 at 190° C./2.16 kg from 0.20 g/10 minutes to 1.5 g/10 minutes. The polyethylene based plastomer has a logM$_{25\%}$ of an upper 25% of a GPC quadrant having a value of 5.1 to 5.7, an intermediate molecular weight distribution (Mw/Mn) of 2.5 to 3, a Mz/Mw value of 2 to 2.5, a Comonomer Distribution Constant value from 60 to 400 and a single SCBD peak between 40-85° C. with a mass fraction of less than 3% above 85° C. as determined by CEF, and a ZSVR value from 1.0 to 5.5. The multilayer thermoplastic film is biaxially stretched at a temperature of 60° C. to 120° C. with a blow-up ratio from 2:1 to 10:1.

19 Claims, 2 Drawing Sheets

MULTILAYER THERMOPLASTIC FILM WITH IMPROVED PUNCTURE RESISTANCE PERFORMANCE

This application is a National Stage Application under 35 U.S.C. § 371 of International Application Number PCT/US2019/047143, filed Aug. 20, 2019 and published as WO 2020/041233 on Feb. 27, 2020, which claims the benefit to U.S. Provisional Application 62/719,842, filed Aug. 20, 2018, the entire contents of which are incorporated herein by reference in its entirety

TECHNICAL FIELD

The present disclosure relates generally to multilayer thermoplastic films and more specifically to multilayer thermoplastic films with improved puncture resistance performance.

BACKGROUND

Food items such as poultry, fresh red meat and cheese, as well as nonfood industrial and retail goods, are packaged by various heat shrink film methods. There are two main categories of heat shrink films blown shrink film and oriented shrink film. Blown shrink film is made by a simple blown film extrusion process of a single bubble, while oriented shrink film is made by more elaborate processes known as double bubble, tape bubble, trapped bubble, or tenter framing. Heat shrink films can be monoaxial or biaxial oriented and are required to possess various other film attributes. In addition to a high shrink response, for successful use in food packaging it must also possess a relatively high puncture resistance.

The shrink packaging method generally involves placing an article(s) into a bag (or sleeve) fabricated from a heat shrink film, then closing or heat sealing the bag, and thereafter exposing the bag to sufficient heat to cause shrinking of the bag and intimate contact between the bag and article. The heat can be provided by conventional heat sources, such as heated air, infrared radiation, hot water, combustion flames, or the like. Heat shrink wrapping of food articles helps preserve freshness, is attractive, hygienic, and allows closer inspection of the quality of the packaged food. Heat shrink wrapping of industrial and retail goods, which is alternatively referred to in the art and herein as industrial and retail bundling, preserves product cleanliness and also is a convenient means of bundling and collating for accounting and transporting purposes.

The biaxial heat-shrink response of an oriented polyolefin film is obtained by initially stretching fabricated film to an extent several times its original dimensions in both the machine and transverse directions to orient the film. The stretching is usually accomplished while the fabricated film is sufficiently soft or molten, although cold drawn shrink films are also known in the art. After the fabricated film is stretched and while still in a stretched condition, the stretch orientation is frozen or set in by quick quenching of the film. Subsequent application of heat will then cause the oriented film to relax and, depending on the actual shrink temperature, the oriented film can return essentially back to its original unstretched dimensions, i.e., to shrink relative to its stretched dimension.

Hence, clearly the orientation window and shrink response of oriented films affected by resin properties and fabrication parameters. The orientation window depends upon the broadness of the resin melting range and, as such, relates directly to the short chain branching distribution of the resin. In general, ethylene alpha-olefin interpolymers having a broad short chain branching distribution and broad melting range (e.g., heterogeneously branched ultra-low density polyethylene resins such as ATTANE™ resins supplied by The Dow Chemical Company) exhibit a wider orientation window compared to ethylene alpha-olefin interpolymers characterized as having a narrow short chain branching distribution and narrow melting range (e.g., homogeneously branched linear ethylene polymers such as EXCEED™ and EXACT™ resins supplied by Exxon Chemical Corporation and as AFFINITY™ resins supplied by The Dow Chemical Company).

Oriented polyolefin film shrinkage depends on shrink tension and film density. Film shrinkage is decreased as the orientation temperature is increased due to lower shrink tension. Film shrinkage is increased at lower density (lower crystallinity) because crystallites provide topological constraints and, as such, hinder free shrinkage. Conversely, for given draw ratio, shrink tension depends on the crystallinity of the resin at the orientation temperature.

While the temperature at which a particular polymer is sufficiently soft or molten is a critical factor in various orientation techniques, in general, such temperatures are ill-defined in the art. Disclosures pertaining to oriented films that disclose various polymer types (which invariably have varying polymer crystallinities and melting points), simply do not define the stretching or orientation temperatures used for the reported comparisons. U.S. Pat. No. 4,863,769 to Lustig et al., WO 95/00333 to Eckstein et al., and WO 94/07954 to Garza et al., the disclosures of which are incorporated herein by reference, are two examples of such disclosures.

The direct effect of density or crystallinity on shrink response and other desired shrink film properties such as, for example, impact resistance, are known, for example, from WO 95/08441, the disclosure of which is incorporated herein by reference. That is, even where the orientation temperature is presumably constant, lower density polymer films will show a higher shrink response and improved impact resistance. However, the effects of density and other resin properties on the orientation temperature is not well-known. In the prior art, there are only general rules of thumb or generalized teachings relating to suitable stretching or orientation conditions. For example, in commercial operations, it is often said that the temperature at which the film is suitably soft or molten is just above its respective glass transition temperature, in the case of amorphous polymers, or below its respective melting point, in the case of semi-crystalline polymers. Multilayered structures composed by different polymers can broad these ranges even further, allowing stretching to occur above melting point of some components and below others.

While the effects of density and other resin properties on the optimum orientation temperature of polyolefins are generally unknown, it is clear that heterogeneously branched ethylene polymers such as ATTANE™ resins and DOWLEX™ resin have a relatively broad orientation window (i.e., the temperature range at which the resin can be substantially stretched when molten or softened). It also clear that softening temperatures and other film properties such as, for example, secant modulus, tend to decrease at lower polymer densities. Because of these relationships, films with high shrink responses, wide orientation windows, high puncture resistance, high modulus and high softening temperatures (i.e., shrink films with balanced properties) are unknown in the prior art. That is, polymer designers invariably have to sacrifice orientation windows to provide films with puncture resistance and high modulus. The importance of higher modulus pertains to, for example, the need for good machinability during automatic packaging operations and good handling during bag making operations.

An example of teaching that's beyond ordinary rules of thumb (but is nevertheless fairly generalized) is provided by Golike in U.S. Pat. No. 4,597,920, the disclosure of which is incorporated herein by reference. Golike teaches orientation should be carried out at temperatures between the lower and higher melting points of a copolymer of ethylene with at least one $C_8$-$C_{18}$ α-olefin. Golike specifically teaches that the temperature differential is at least 10° C., however, Golike also specifically discloses that the full range of the temperature differential may not be practical because, depending on the particular equipment and technique used, tearing of the polymer film may occur at the lower end of the range. At the higher limit of the range, Golike teaches the structural integrity of the polymer film begins to suffer during stretching (and ultimately fails at higher temperatures) because the polymer film then is in a soft, molten condition. See, U.S. Pat. No. 4,597,920, Col. 4, lines 52-68 bridging to Col. 5, lines 1-6. The orientation temperature range defined by Golike (which is based on higher and lower peak melting points) generally applies to polymer blends and heterogeneously branched ethylene/α-olefin interpolymers, i.e. compositions having two or more DSC melting points, and does not apply at all to homogeneously branched ethylene/α-olefin interpolymers which have only a single DSC melting point. Golike also indicates that a person of ordinary skill can determine the tear temperature of a particular polymer and discloses that for heterogeneously branched interpolymers having a density of about 0.920 g/cm³, the tear temperature occurs at a temperature above the lower peak melting point. See, U.S. Pat. No. 4,597,920, Col. 7, Example 4. However, Golike does not teach or suggest how a person of ordinary skill in the art of shrink film can optimize the orientation process as to stretching temperature at a given stretching rate and ratio to maximize the shrink response and achieve balanced properties.

Hideo et al. in EP 0359907 A2, the disclosure of which is incorporated herein by reference, teach the film surface temperature at the starting point of stretching should be within the range of from 20° C. to about 30° C. below the melting temperature of the polymer as determined in regards to the main DSC endothermic peak. While such teaching is considered applicable to homogeneously branched ethylene/α-olefin interpolymers having a single DSC melting peak, the prescribed range is fairly general and broad. Moreover, Hideo et al. do not provide any specific teaching as to the optimum orientation temperature for a particular interpolymer respecting heat shrink response, nor any other desired shrink film property.

WO 95/08441, the disclosure of which is incorporated herein by reference, provides generalized teachings pertaining to homogeneously branched ethylene/cc-olefin interpolymers. In the Examples of this disclosure, several different homogeneously branched substantially linear ethylene/α-olefin interpolymers were studied and compared to one heterogeneously branched ethylene/α-olefin interpolymers. Although the homogeneously branched substantially linear ethylene/α-olefin interpolymers had densities that varied from about 0.896 to about 0.906 g/cm³, all of the interpolymers (including the heterogeneously branched linear ethylene/α-olefin interpolymer, ATTANE™ 4203, supplied by The Dow Chemical Company, which had a density of 0.905 g/cm³) were oriented at essentially the same orientation temperatures. Reported results in WO 95/08441 disclose three general findings: (1) at an equivalent polymer density, substantially linear ethylene/α-olefin interpolymers and heterogeneously branched linear ethylene/cc-olefin interpolymers have essentially equivalent shrink responses (compare Example 21 and Example 39 at pages 15-16), (2) shrink responses increase at lower densities and constant orientation temperatures, and (3) as orientation temperature increases, orientation rates increase. Furthermore, careful study of the Examples and unreported DSC melting point data for the interpolymers reported on in WO 95/08441 indicate for the Examples disclosed in WO 95/08441 that, at a given stretching rate and ratio, there is a preference for orienting multilayer film structures at orientation temperatures above the respective DSC melting point of the polymer employed as the shrink control layer. Moreover, none of the teachings or Examples in WO 95/08441 suggest a shrink film with balanced properties is obtainable.

Other disclosures that set forth orientation information regarding homogeneously branched ethylene polymers yet do not specify orientation conditions relative to respective lowest stretch temperatures, nor teach requirements for balanced shrink film properties include EP 0 600425A1 to Babrowicz et al. and EP 0 587502 A2 to Babrowicz et al., the disclosures of which are incorporated herein by reference.

Accordingly, although there are general rules and general disclosures as to shrink responses and suitable orientation temperatures for biaxially orienting polyolefins, there is no specific information as to optimum orientation conditions as a function of polymer type and, more importantly, there is no specific information as to balanced or optimized shrink responses, wide orientation windows, high modulus, and/or high puncture resistance. As such, it is an object of the present disclosure to provide an improved shrink film with a maximized shrink response, an increased orientation window and, for a given modulus or polymer density, a relatively high puncture resistance. This and other objects will become apparent from the description and various that follow.

SUMMARY

The present disclosure provides for a heat-shrinkable, biaxially stretched, multilayer thermoplastic film that includes at least a puncture resistant layer formed with a polyethylene based plastomer having a density of 0.890 g/cm³ to 0.910 g/cm³ as measured in accordance with ASTM D-792, and a melt index (MI) as measured by ASTM D-1238 at 190° C./2.16 kg from 0.20 g/10 minutes to 1.5 g/10 minutes. The polyethylene based plastomer has a $logM_{25\%}$ of an upper 25% of a GPC quadrant having a value of 5.1 to 5.7, an intermediate molecular weight distribution (Mw/Mn) of 2.5 to 3, a value for Mz/Mw from 2 to 2.5. The polyethylene based plastomer is further characterized by Comonomer Distribution Constant value from 60 to 400 and a single SCBD peak between 40-85° C. with a mass fraction of less than 3% above 85° C. as determined by CEF and a ZSVR value from 1.0 to 5.5. The multilayer thermoplastic film is biaxially stretched at a temperature of 60° C. to 120° C. with a blow-up ratio from 2:1 to 10:1. The polyethylene based plastomer can also have a MI as measured by ASTM D-1238 at 190° C./2.16 kg, from 0.75 g/10 minutes to 1 g/10 minutes. The polyethylene based plastomer can have a density of 0.900 g/cm³ to 0.910 g/cm³ as determined in accordance with ASTM D-792.

In one embodiment, the polyethylene based plastomer of the puncture resistant layer is an ethylene interpolymer with at least one α-olefin of 3 to 20 carbon atoms. In an alternative embodiment, the polyethylene based plastomer of the puncture resistant layer is an ethylene/α-olefin copolymer. In one embodiment, the ethylene/α-olefin copolymer is an ethylene/1-octene copolymer. The puncture resistant layer can further comprise 5 weight percent to 50 weight percent of an ethylene/vinyl acetate copolymer based on the weight of the blend. Alternatively, the polyethylene based plastomer of the puncture resistant layer is blended with 5 weight percent to 50 weight percent of heterogeneously branched ultra-low density polyethylene or heterogeneously branched very-low density polyethylene, or heterogeneously branched linear low density polyethylene based on the weight of the blend.

For the various embodiments the multilayer thermoplastic film can further include a second polymeric layer adjacent to the puncture resistant layer, where the puncture resistant layer and the second polymeric layer of the multilayer thermoplastic film are biaxially stretched at a temperature of 60° C. to 120° C. with a blow-up ratio from 2:1 to 10:1. For the various embodiments, the second polymeric layer can be formed of a polymer selected from the group consisting of an ultra-low density polyethylene, a very-low density polyethylene, an ethylene/α-olefin interpolymer, an ethylene/α-olefin block co-polymer, an ethylene-vinyl acetate copolymer, a polyamide, a copolymer of polyvinylidene chloride, ethylene vinyl alcohol or a linear low-density polyethylene-grafted-maleic anhydride. In addition, the multilayer thermoplastic film can also further include a third polymeric layer positioned between the puncture resistant layer and the second polymeric layer, where the puncture resistant layer, the second polymeric layer and the third polymeric layer of the multilayer thermoplastic film are biaxially stretched at a temperature of 60° C. to 120° C. with a blow-up ratio from 2:1 to 10:1. The second polymeric layer and the third polymeric layer are independently formed of a polymer selected from the group consisting of an ultra-low density polyethylene, a very-low density polyethylene, an ethylene/α-olefin interpolymer, an ethylene/α-olefin block co-polymer, an ethylene-vinyl acetate copolymer, a polyamide, a copolymer of polyvinylidene chloride, ethylene vinyl alcohol or a linear low-density polyethylene-grafted-maleic anhydride. In one embodiment, the polymer of the second polymeric layer is a structurally different polymer than the polymer of the third polymeric layer. For the various embodiments, the third polymeric layer is an ethylene-vinyl acetate copolymer and the second polymeric layer comprises an ethylene/α-olefin interpolymer and an ultra-low density polyethylene.

The biaxial-oriented polymeric film of the present disclosure can also include a barrier polymeric layer and tie layers adjacent to the puncture resistant layer or the second layer, where the puncture resistant layer and set of barrier and tie layers of the biaxial-oriented polymer film are biaxially stretched at a temperature of 60° C. to 120° C. with a blow-up ratio from 2:1 to 10:1.

For the embodiments provided herein, the multilayer thermoplastic film can be prepared by a double-bubble process. The multilayer thermoplastic film is suitable for use in packaging food articles.

The present disclosure also provides for a method of forming a heat-shrinkable, biaxially stretched, multilayer thermoplastic film suitable for use in fabricating bags for packaging food articles. The method includes forming a first extruded bubble with a polyethylene based plastomer having a density of 0.890 g/cm$^3$ to 0.910 g/cm$^3$ as determined in accordance with ASTM D-792 and a melt index (MI) as measured by ASTM D-1238, Condition 190° C./2.16 kg, from 0.20 g/10 minutes to 1.5 g/10 minutes, wherein the polyethylene based plastomer has a logM$_{25\%}$ of an upper 25% of a GPC quadrant having a value of 5.1 to 5.7; an intermediate molecular weight distribution (Mw/Mn) of 2.5 to 3 and a Mz/Mw value of 2 to 2.5; a Comonomer Distribution Constant value from 60 to 400 and a single SCBD peak between 40-85° C. with a mass fraction of less than 3% above 85° C. as determined by CEF; and a ZSVR value from 1.0 to 5.5; collapsing the first extruded bubble to form a first multilayer structure; passing the first multilayer structure through a first water bath having a temperature of 5° C. to 50° C. to cool the first multilayer structure, wherein the first multilayer structure has a residence time of 0.5 to 50 seconds in the water of the first water bath; passing the first multilayer structure through a second water bath having a temperature of 80° C. to 100° C. to warm the first multilayer structure coming from the first water bath, wherein the first multilayer structure has a residence time of 5 to 50 seconds in the water of the second water bath; heating the first multilayer structure to a temperature of 60° C. to 120° C.; forming a second extruded bubble with the first multilayer structure heated to the temperature of 60° C. to 120° C., wherein the first multilayer structure has a blow-up ratio from 2:1 to 10:1 in forming the second extruded bubble; and collapsing the second extruded bubble to form the heat-shrinkable, biaxially stretched, multilayer thermoplastic film.

DETAILED DESCRIPTION

Figure 1:
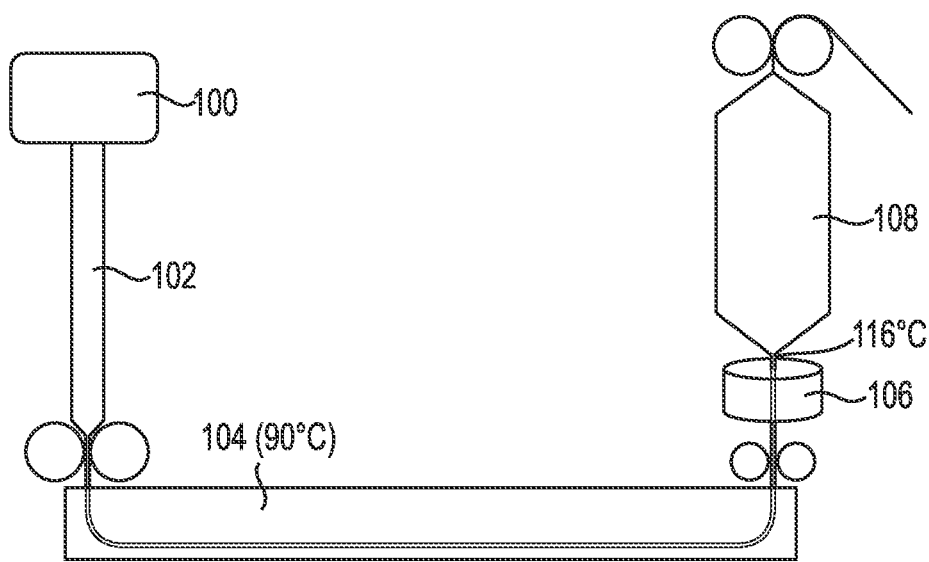
FIG. 1 is an apparatus for preparing multilayer structures using a double bubble or trapped bubble process.

The present disclosure provides for a heat-shrinkable, biaxially stretched, multilayer thermoplastic film, a method of producing the same, and articles made therefrom. The heat-shrinkable, biaxially stretched, multilayer thermoplastic film of the present disclosure includes at least a puncture resistant layer formed with a polyethylene based plastomer having a density of 0.890 g/cm$^3$ to 0.910 g/cm$^3$ and a melt index (MI) measured at 190° C./2.16 kg from 0.2 g/10 minutes to 1.5 g/10 minutes. The polyethylene based plastomer has a logM$_{25\%}$ of an upper 25% of a GPC quadrant having a value of 5.1 to 5.7, an intermediate molecular weight distribution (Mw/Mn) of 2.5 to 3 and a Mz/Mw value from 2 to 2.5. The composition is further characterized by Comonomer Distribution Constant value from 60 to 400 and a single SCBD peak between 40-85° C. with a mass fraction of less than 3% above 85° C. as determined by CEF and a ZSVR value from 1.0 to 5.5. The multilayer thermoplastic film of the present disclosure is biaxially stretched at a temperature of 60° C. to 120° C. with a blow-up ratio from 2:1 to 10:1.

For the various embodiments, the polyethylene based plastomer of the present disclosure has a density of 0.890 g/cm$^3$ to 0.910 g/cm$^3$. Preferably, the polyethylene based plastomer of the present disclosure has a density of 0.900 g/cm$^3$ to 0.910 g/cm$^3$. The densities provided herein are determined in accordance with ASTM D-792.

The melt index of a polymer is inversely proportional to the molecular weight of the polymer. Thus, the higher the molecular weight, the lower the melt index, although the relationship is not linear. For the various embodiments, the polyethylene based plastomer of the present disclosure has a melt index (MI) measured at 190° C./2.16 kg ($I_2$) from 0.2 g/10 minutes to 1.5 g/10 minutes. Preferably, the polyethylene based plastomer of the present disclosure has a MI measured at 190° C./2.16 kg ($I_2$), from 0.50 g/10 minutes to 1.5 g/10 minutes. More preferably, the polyethylene based plastomer of the present disclosure has a MI measured at 190° C./2.16 kg ($I_2$), from 0.75 g/10 minutes to 1.5 g/10 minutes. The MI values measured at 190° C./2.16 kg are determined in accordance with ASTM D-1238.

Other measurements useful in characterizing the molecular weight of the polyethylene based plastomer of the present disclosure involve melt index determinations with higher weights, such as, for common example, ASTM D-1238, Condition 190° C./10 kg ($I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$. For the polyethylene based plastomer of the present disclosure used to prepare the puncture resistant layer of the heat-shrinkable, biaxially stretched, multilayer thermoplastic film of the present disclosure, the melt flow ratio indicates the molecular weight distribution and/or the degree of long chain branching, i.e., the higher the $I_{10}/I_2$ melt flow ratio, the broader MWD in the polymer and/or more long chain branching in the polymer. In addition to being indicative of MWD and long chain branching, higher $I_{10}/I_2$ ratios are also indicative of lower viscosity at higher shear rates (easier processing) and higher extensional viscosity. The $I_{10}/I_2$ ratio of the polyethylene based plastomer of the present disclosure is preferably in the range of from 6 to about 15. More preferably, the $I_{10}/I_2$ ratio of the polyethylene based plastomer of the present disclosure is in the range of from 7 to about 12 or from about 8 to 10.

For the various embodiments, the polyethylene based plastomer has a $\log M_{25\%}$ of an upper 25% of a GPC quadrant having a value of 5.1 to 5.7. Preferably, the polyethylene based plastomer has a $\log M_{25\%}$ of an upper 25% of a GPC quadrant having a value of 5.2 to 5.6. The $\log M_{25\%}$ of the upper 25% of the GPC quadrant is calculated using the quadrants from the MWD using GPC. Calculating the quadrants from MWD by GPC is as follows. The molecular weight distribution from GPC as plotted (dWf/dLogM vs LogM) by definition has an area equivalent to 1. This plot is divided into four equivalent area sections (weight fraction=0.25) integrating from high molecular weight to low molecular weight. The average logM was determined for each quadrant (25%, 50%, 75%, 100%) as follows in Equation 1A-1D:

$$\log M_{25\%} = \frac{\sum_{highestLogMW}^{Area=0.25}(IR_i * \log Mgpc_i)}{\sum_{HighestLogMw}^{Area=0.25}(IR_i)}$$ (EQ1A)

$$\log M_{50\%} = \frac{\sum_{Area=0.25}^{Area=0.50}(IR_i * \log Mgpc_i)}{\sum_{Area=0.25}^{Area=0.50}(IR_i)}$$ (EQ1B)

$$\log M_{75\%} = \frac{\sum_{Area=0.50}^{Area=0.75}(IR_i * \log Mgpc_i)}{\sum_{Area=0.50}^{Area=0.75}(IR_i)}$$ (EQ1C)

$$\log M_{100\%} = \frac{\sum_{Area=0.75}^{lowestLogMw}(IR_i * \log Mgpc_i)}{\sum_{Area=0.75}^{lowestLogMw}(IR_i)}$$ (EQ1D)

Wherein the MWD area is integrated at each dWf/dLogM from the highest detectable logMw to the lowest detectable logMw, and each slice (i) represents 0.01 LogMw in width. The average GPC molecular weight for each quadrant is calculated as: $10^{\wedge}\text{LogM}_{Quadrant}$ and this value will be different than the mathematical average obtained by taking the average of $10^{\wedge}\text{LogMi}$ at each slice (i) within the quadrant.

The puncture resistant layer of the multilayer thermoplastic film of the present disclosure further includes a molecular weight distribution ($M_w/M_n$) of 2.5 to 3. Values for the number average molecular weight ($M_n$) are determined from values of the molecular mass of the polyethylene based plastomer measured using gel permeation chromatography having a differential refractive index detector, where polystyrene having known molecular weight are used as the standards, as are known in the art. Values for the weight average molecular weight ($M_w$) are determined from known techniques such as static light scattering, small angle neutron scattering, x-ray scattering or sedimentation velocity.

Methods for measuring $M_z$ are found in the conventional gel permeation chromatography description in the Examples section of the present disclosure. The puncture resistant layer of the multilayer thermoplastic film of the present disclosure further includes a molecular weight distribution (Mz/Mw) of 2 to 2.5. Values for the weight average molecular weight ($M_w$) are determined as discussed above.

In one embodiment, the polyethylene based plastomer of the puncture resistant layer is an ethylene interpolymer with at least one α-olefin of 3 to 20 carbon atoms ($C_3$-$C_{20}$). Suitable polyethylene based plastomer for use in the puncture resistant layer include substantially linear ethylene interpolymers, homogeneously branched linear ethylene interpolymers, heterogeneously branched linear ethylene interpolymers (e.g., linear low-density polyethylene (LLDPE), and ultra-low or very-low density polyethylene (ULDPE or VLDPE)), and combinations or mixtures thereof.

Examples of the polyethylene based plastomer of the puncture resistant layer for the present disclosure can include those provided in U.S. Pat. No. 8,389,086 B2, which is incorporated herein by reference in its entirety. For the various embodiments, the polyethylene based plastomer can have a melt index less than 2 grams/10 minutes, or in the alternative, from 0.2 to 1.5 grams/10 minutes, a density less than or equal to 0.910 g/cm³, for example from 0.8602 less than or equal to 0.910 g/cm³, a total heat of fusion less than 120 Joules/gram and a heat of fusion above 115° C. of less than 5 Joules/gram. In addition, the polyethylene based plastomer can have a molecular weight distribution (Mw/Mn) of at least 2.5, for example, from 2.5 to 3.5; and a Comonomer Distribution Constant (CDC) greater than about 45 and as high as 400. The polyethylene based plastomer has a CDC of 60 to 400 in some embodiments, or of 100 to 300 in some other embodiments, or of 100 to 200 in some other embodiments. The polyethylene based plastomer also can have less than 120 total unsaturation unit/1,000,000 carbons (C). CDC is defined as Comonomer Distribution Index divided by Comonomer Distribution Shape Factor multiplying by 100. Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the width at half peak height (Half-Width) of comonomer distribution profile divided by the standard deviation (Stdev) of comonomer distribution profile from the peak temperature (Tp). The polyethylene based plastomer can also have any combination of the following properties in addition to the ones provided above: up to about 3 long chain branches/1000 carbons; less than 20 vinylidene unsaturation unit/1,000,000 C; a single DSC melting peak. In one embodiment, the polyethylene-based polymer that can be used in the puncture resistant layer has the following CDC and CDI values:

| Comonomer Distribution Index (CDI) | Standard Deviation (° C.) | Half Width (° C.) | Half Width (Std. Dev.) | Comonomer Distribution Constant (CDC) |
|---|---|---|---|---|
| 89.10 | 9.48 | 6.61 | 0.70 | 127.9 |

Preferably, single site catalyst systems are used to produce the polyethylene based plastomer of the puncture resistant layer, where certain level of long chain branching (LCB) are found in the system depending on process conditions. Preferably, the levels of LCB in the polyethylene based plastomer are measured by calculating the zero-shear viscosity ratio (ZSVR). The ZSVR is defined as the ratio of the zero-shear viscosity (ZSV) of the branched polyethylene material to the ZSV of the linear polyethylene material at the equivalent average molecular wt. according to the equation:

$$ZSVR = \eta_{0B}/\eta_{0L} = \eta_{0B}/(2.29^{-15} \times Mwt^{3.65})$$

The ZSV value is obtained from a creep test at 190° C., via the method described above. The Mwt is determined using gel permeation chromatography, as described above. The correlation between the ZSV of linear polyethylene and its molecular weight was established based on a series of linear polyethylene reference materials. Lower ZSVR indicates lower level of long chain branching. Preferred ZSVR values for the polyethylene based plastomer of the puncture resistant layer are those from 1.0 to 5.5, preferably 2.5 to 5.5, more preferably from 2.5 to 3.5 or from 4.5 to 5.5. Substantially linear ethylene polymers are sold under the designation of AFFINITY™ and ENGAGE™ resins by The Dow Chemical Company and Dupont Dow Elastomers, respectively. Homogeneously branched linear ethylene polymers are sold under the designation of TAFMER™ by Mitsui Chemical Corporation and under the designation of EXACT™ and EXCEED™ resins by Exxon Chemical Corporation, respectively. Heterogeneously branched linear ethylene polymers are sold under the designations of ATTANE™, DOWLEX™ and FLEXOMER by The Dow Chemical Company.

The term "substantially linear ethylene polymer" as used herein refers to homogeneously branched ethylene/α-olefin interpolymers that have a narrow short chain branching distribution and contain long chain branches as well as short chain branches attributable to homogeneous comonomer incorporation. Typically, the polyethylene based plastomer of the puncture resistant layer is an ethylene/α-olefin copolymer (e.g., a homogeneously branched substantially linear ethylene polymer or a homogeneously branched linear ethylene polymer). It can also be a blend of more than one homogeneously branched substantially linear ethylene polymer or homogeneously branched linear ethylene polymer. The blend of more than one homogenously branched substantially linear ethylene polymer or homogeneously branched linear ethylene polymer can be a blend formed in situ inside the reactor, where the polymer have approximately the same density, but have different molecular weights.

The α-olefin of the ethylene/α-olefin copolymers is at least one $C_3$-$C_{20}$ α-olefin, such as propylene, isobutylene, 1-butene, 1-hexene, 4-methyl-1pentene, 1-heptene, 1-octene, 1-nonene, 1-decene, and the like. Preferred α-olefins include propylene, 1-butene, 1-hexene, 4-methyl-1-pentene and 1-octene, where 1-octene is especially preferred. Most preferably, the ethylene/α-olefin interpolymer is a copolymer of ethylene and a $C_3$-$C_{20}$ α-olefin, especially an ethylene/$C_4$-$C_{10}$ α-olefin copolymer and most especially an ethylene/1-octene copolymer. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

The long chain branches are of the same structure as the backbone of the polymer and are longer than the short chain branches. The polymer backbone of substantially linear (α-olefin polymers is substituted with an average of 0.01 to 3 long chain branch/1000 carbons). Preferred substantially linear polymers for use in the disclosure are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer backbone to which it is attached. Long chain branches are obviously of greater length than of short chain branches resulting from comonomer incorporation.

The presence of long chain branching can be determined in ethylene homopolymers by using $^{13}C$ nuclear magnetic resonance (NMR) spectroscopy and is quantified using the method described by Randall (Rev. Macromol. Chem. Phys., C29, V. 2 & 3, p. 285-297). Other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV).

The term "homogeneously branched linear ethylene polymer" is used in the conventional sense in reference to a linear ethylene interpolymer or substantially linear ethylene interpolymer in which the comonomer is randomly distributed within a given polymer molecule and where substantially all of the polymer molecules have the same ethylene to comonomer molar ratio. The terms refer to an ethylene interpolymer that is characterized by a relatively high short chain branching distribution index (SCBDI) or composition distribution branching index (CDBI). That is, the interpolymer has a SCBDI greater than or equal to about 50 percent, preferably greater than or equal to about 70 percent, more preferably greater than or equal to about 90 percent and essentially lack a measurable high density (crystalline) polymer fraction in TREF analysis.

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from data obtained from techniques known in the art, such as, for example, temperature rising elution fractionation (abbreviated herein as "TREF") as described, for example, by Wild et al., Journal of Polymer Science, Poly. Phys. Ed., Vol. 20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1-2, pp. 107-119 (1985), the disclosures of all which are incorporated herein by reference. However, the preferred TREF technique does not include purge quantities in SCBDI calculations. More preferably, the monomer distribution of the interpolymer and SCBDI are determined using .sup.13 C NMR analysis in accordance with techniques described in U.S. Pat. No. 5,292,845 and by J. C. Randall in Rev. Macromol. Chem. Phys., C29, pp. 201-317, the disclosures of both of which are incorporated herein by reference.

In addition to referring to a homogeneous (or narrow) short branching distribution, the term "homogeneously branched linear ethylene interpolymer" also means the interpolymer does not have long chain branching or substantially linear ethylene interpolymer. That is, the ethylene interpolymer has an absence of long chain branching and a linear polymer backbone in the conventional sense of the term "linear." However, the term "homogeneously branched linear ethylene polymer" does not refer to high pressure branched polyethylene which is known to those skilled in the art to have numerous long chain branches. Homogeneously branched ethylene polymers can be made using polymerization processes (e.g., those described by Elston in U.S. Pat. No. 3,645,992) which provide a uniform (narrow) short branching distribution (i.e., homogeneously branched). Homogeneously branched linear ethylene polymers can be prepared in solution, slurry or gas phase processes using hafnium, zirconium and vanadium catalyst systems.

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than about 50 percent and more typically less than about 30 percent.

Heterogeneously branched ethylene polymers are well known among practitioners of the linear polyethylene art. Heterogeneously branched ethylene polymers are prepared using conventional Ziegler-Natta solution, slurry or gas phase polymerization processes and coordination metal catalysts. These conventional Ziegler-Natta type linear polyethylenes are not homogeneously branched, do not have any long-chain branching and, as such, have a linear polymer backbone in the conventional sense of the term "linear."

The puncture resistant layer can further comprise 5 weight percent to 50 weight percent of an ethylene/vinyl acetate copolymer based on the weight of the blend. Alternatively, the polyethylene based plastomer of the puncture resistant layer is blended with 5 weight percent to 50 weight percent of heterogeneously branched ultra-low density polyethylene or heterogeneously branched very-low density polyethylene based on the weight of the blend. Blends and mixtures of the polyethylene based plastomer of the puncture resistant layer compositions with other polyolefins may also be performed. Suitable polymers for blending with the polyethylene based plastomer of the puncture resistant layer compositions include thermoplastic and non-thermoplastic polymers including natural and synthetic polymers. Exemplary polymers for blending include polypropylene, (both impact modifying polypropylene, isotactic polypropylene, atactic polypropylene, random ethylene/propylene copolymers and random ethylene/propylene/butene terpolymers), various types of polyethylene, including high pressure, free-radical LDPE, Ziegler-Natta LLDPE, metallocene PE, including multiple reactor PE ("in reactor" blends of Ziegler-Natta PE and metallocene PE), ethylene-vinyl acetate (EVA), ethylene/vinyl alcohol copolymers, Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the polyethylene based plastomer of the puncture resistant layer compositions.

The multilayer thermoplastic film of the present disclosure can have a thickness before shrinkage of 10 micrometer (µm) to 200 µm. Preferably, the multilayer thermoplastic film has a thickness of 30 µm to 100 µm. As discussed herein, the polyethylene based plastomer of the multilayer thermoplastic film has a thickness of 3 µm to 90 µm.

Although it is possible to use the puncture resistant layer discussed herein as a monolayer, the multilayer thermoplastic film of the present disclosure also one or more additional layers. For example, the multilayer thermoplastic film can further include a second polymeric layer adjacent the puncture resistant layer, where the puncture resistant layer and the second polymeric layer of the multilayer thermoplastic film are biaxially stretched at a temperature of 60° C. to 120° C. with a blow-up ratio from 2:1 to 10:1. In addition, the multilayer thermoplastic film can also further include a third polymeric layer positioned between the puncture resistant layer and the second polymeric layer, where the puncture resistant layer, the second polymeric layer and the third polymeric layer of the multilayer thermoplastic film are biaxially stretched at a temperature of 60° C. to 120° C. with a blow-up ratio from 2:1 to 10:1. The second polymeric layer and the third polymeric layer are independently formed of a polymer selected from the group consisting of an ultra-low density polyethylene, a very-low density polyethylene, an ethylene/α-olefin interpolymer, an ethylene/α-olefin block co-polymer, an ethylene-vinyl acetate copolymer, a polyamide, a copolymer of polyvinylidene chloride, ethylene vinyl alcohol or a linear low-density polyethylene-grafted-maleic anhydride. In one embodiment, the polymer of the second polymeric layer is a structurally different polymer than the polymer of the third polymeric layer. For the various embodiments, the third polymeric layer is an ethylene-vinyl acetate copolymer and the second polymeric layer comprises an ethylene/α-olefin interpolymer and an ultra-low density polyethylene. These additional layers and their functions in the multilayer thermoplastic film are discussed more fully herein.

For the various embodiments, the multilayer thermoplastic film of the present disclosure includes at least two additional layers, where the puncture resistant layer formed with the polyethylene based plastomer polyethylene provides an inner layer (e.g., is positioned at least between two additional layers) of the multilayer thermoplastic film. So, it is preferable that the puncture resistant layer be used in a multilayer thermoplastic film having 3 or more layers; more preferably 3 to 9 layers; and still more preferably 3 to 5 or 3 to 7 layers.

For coextruded or laminated multilayer film structures (e.g., a 3-layer film structures), the puncture resistant layer described herein can be used as a core layer, an outer surface layer, an intermediate layer and/or an inner sealant layer of the structure. Generally, for a multilayer film structure, the puncture resistant layer comprises at least 10 percent of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terepthalate (PET), oriented polypropylene (OPP), ethylene/vinyl acetate (EVA) copolymers, ethylene/acrylic acid (EAA) copolymers, ethylene/methacrylic acid (EMAA) copolymers, ULDPE, LLDPE, HDPE, MDPE, LMDPE, LDPE, ionomers, graft-modified polymers (e.g., maleic anhydride grafted polyethylene), and paper.

So, the heat-shrinkable, biaxially stretched, multilayer thermoplastic film having the puncture resistant layer of the present disclosure may be a two (2) to fifteen (15) layer structure, with a sealant layer composition (such as, for example, but not limited to, another polymer mixture, at least one homogeneous branched substantially linear ethylene polymer, at least one homogeneously branched linear ethylene polymer, or at least one heterogeneously branched ultra or very low density polyethylene), an outer layer (such as, for example, another polymer mixture or at least one heterogeneously branched linear low density or ultra-low density polyethylene), and a core layer formed from the puncture resistant layer as provided herein interposed between. Adhesion promoting tie layers (such as PRIMACOR™ ethylene-acrylic acid (EAA) copolymers available from SK Chemical, MAH grafted ethylene copolymers (MAH PE), and/or ethylene-vinyl acetate (EVA) copolymers), as well as additional structural layers (such as Affinity™ polyolefin plastomers, Engage™ polyolefin elastomers, both available from The Dow Chemical Company, ultra-low density polyethylene, or blends of any of these polymers with each other or with another polymer, such as EVA) may be optionally employed.

Other layers of the multilayer structure include but are not limited to barrier layers, and/or tie layers, and/or structural layers, as discussed herein. Various materials can be used for these layers, with some of them being used as more than one layer in the same film structure. Some of these materials include: nylon, ethylene/vinyl alcohol (EVOH) copolymers, polyvinylidene chloride (PVDC), polyethylene terepthalate (PET), ethylene/vinyl acetate (EVA) copolymers, ethylene/acrylic acid (EAA) copolymers, ethylene/methacrylic acid (EMAA) copolymers, ULDPE, LLDPE, HDPE, MDPE, LMDPE, LDPE, ionomers, graft-modified polymers (e.g., maleic anhydride grafted polyethylene).

Examples of possible multilayer structures include: puncture resistant layer of the present disclosure/MAH PE (tie)/EVOH/MAH PE (tie)/PE; puncture resistant layer of the present disclosure/EVA/puncture resistant layer of the present disclosure/EVA/heat sealing layer; or puncture resistant layer of the present disclosure/EVA/PVDC/EVA/outer layer, where the outer layer is selected from a plastomer or other ethylene alpha olefin interpolymer sealant, PE (e.g., LLDPE or ULDPE), EVA, PVDC, EVA or a sealant layer as provided herein.

In one embodiment disclosed herein, a multilayer film structure comprising at least three layers (e.g., an "AB/A" structure), wherein at least one core or hidden layer is a puncture resistant layer, as discussed herein. Generally, the ratio of the film structure layers is such that the core layer dominates the film structure in terms of its percentage of the entire structure. In one embodiment, the multilayer thermoplastic film of the present disclosure provides for the puncture resistant layer formed with the polyethylene based plastomer polyethylene with two exterior layers, where the puncture resistant layer comprises 10 weight percent (wt. %) to 90 wt. % of the multilayer thermoplastic film based on the total weight of the multilayer thermoplastic film. For example, the core layer can be at least about 33% of the total film structure (e.g., in a three-layer film structure, each "A" outer layer comprises 33% by weight of the total film structure, while the core puncture resistant layer (the "B" layer) comprises 33% by weight of the total film structure). In a three-layer film structure, preferably, the core puncture resistant layer comprises at least about 70% of the total film structure. Additional hidden layers can also be incorporated into the film structures without detriment to the optical properties. For example, tie or intermediate layers comprising, for example, ethylene/vinyl acetate copolymers, ethylene acrylic add copolymers or anhydride graft-modified polyethylenes can be used, or barrier layers comprising, for example, vinylidene chloride/vinyl chloride copolymers or ethylene vinyl alcohol copolymers can be used. In a more preferred three-layer film structure, each "A" outer layer comprises 15% by weight of the total film structure of at least one substantially linear ethylene polymer, and the "B" puncture resistant layer comprises 70% by weight of the total film structure. The multilayer film structure can be oriented and/or irradiated (in any order) to provide a multilayer shrink film structure with improved puncture resistance.

For the various embodiments, at least one of the multilayer film structure can be a heat sealing layer. Preferably, the heat sealing layer comprises a blend of at least one ethylene-α-olefin copolymer (EAO), with ethylene vinyl acetate (EAO:EVA blend). Suitable α-olefins include $C_3$ to $C_{10}$ α-olefins such as propene, butene-1, pentene-1, hexene-1, methylpentene-1, octene-1, decene-1 and combinations thereof. The heat seal layer is optionally the thickest layer of a multilayer film and may significantly contribute to the puncture resistance of the film. Another desirable characteristic affected by this layer is the heat seal temperature range. It is preferred that the temperature range for heat sealing the film be as broad as possible. This allows greater variation in the operation of the heat sealing equipment relative to a film having a very narrow range. For example, it is desirable for a suitable film to heat seal over a broad temperature range providing a heat sealing window of 25° C. or higher.

The multilayer film structures can also be oxygen permeable either by using the substantially linear ethylene polymers (SLEP) alone in the film, or in combination with other oxygen permeable film layers such as, for example, ethylene/vinyl acetate (EVA) and/or ethylene/acrylic acid (EAA). These films are preferably prepared with good oxygen permeability, stretchability, elastic recovery and heat seal characteristics, and can be made available to wholesalers and retailers in any conventional form, e.g. stock rolls, as well as be used on conventional packaging equipment.

The biaxial-oriented polymeric film of the present disclosure can also include a barrier polymeric layer and tie layers adjacent the puncture resistant layer, where the puncture resistant layer and set of barrier and tie layers of the biaxial-oriented polymer film are biaxially stretched at a temperature of 60° C. to 120° C. with a blow-up ratio from 2:1 to 10:1.

In another aspect, the multilayer film structures can comprise an oxygen and/or moisture barrier layers. The terms "barrier" or "barrier layer" as used herein means a layer of a multilayer film which acts as a physical barrier to moisture or oxygen molecules. Advantageous for packaging of oxygen sensitive materials such as fresh red meat, a barrier layer material in conjunction with the other film layers will provide an oxygen gas transmission rate ($O_2$GTR) of less than 70 (preferably 45 or less, more preferably 15 or less) cubic centimeter (cc) per square meter in 24 hours at one atmosphere at a temperature of 23° C. and 0% relative humidity. When an oxygen barrier layer is needed, it is usually provided as a separate layer of a multilayer film, most commonly as the core layer sandwiched between an inner heat sealing layer and an outer layer, though additional layers may also be included, such as tie or adhesive layers as well as layers to add or modify various properties of the desired film, e.g., heat sealability, toughness, abrasion resistance, tear-resistance, heat shrinkability, delamination resistance, stiffness, moisture resistance, optical properties, printability, etc.

Oxygen barrier materials which may be included in the multilayer thermoplastic film include ethylene vinyl alcohol copolymers (EVOH), metal foils, metallized polyesters, polyacrylonitriles, silica oxide treated polymeric films, polyamides and vinylidene chloride copolymers (PVDC). Preferred oxygen barrier polymers for use with the present disclosure are vinylidene chloride copolymers or vinylidene chloride with various comonomers such as vinyl chloride (VC-VDC copolymer) or methyl acrylate (MA-VDC copolymer), as well as EVOH.

The thickness of the monolayer or multilayer film structures may vary. However, for both the monolayer and multilayer film structures described herein, the thickness is typically from about 10 micrometers to about 200 micrometers, preferable from about 20 micrometers to about 150 micrometers), and especially from about 30 micrometers to about 130 micrometers.

The multilayer film structures of the present disclosure can also undergo irradiation crosslinking. In an irradiation crosslinking process, the multilayer film structures of the present disclosure can be fabricated by a blown film process and then exposed to an irradiation source (beta or gamma) at an irradiation dose of up to 50 megarad (Mrad) to crosslink the polymeric film. Irradiation crosslinking can be induced before or after final film orientation whenever oriented films are desired such as for shrink and skin packaging, however, preferably irradiation crosslinking is induced before final orientation. Irradiation techniques useful for treating the film structures described herein include techniques known to those skilled in the art. Preferably, the irradiation is accomplished by using an electron beam (beta) irradiation device at a dosage level of from about 0.5 Mrad to about 30 Mrad. Shrink film structures fabricated from the multilayer film structures of the present disclosure are also expected to exhibit improved physical properties due to a lower degree of chain scission occurring as a consequence of the irradiation treatment.

For the embodiments provided herein, the multilayer thermoplastic film can be prepared using a variety of processes. For example, the multilayer thermoplastic film structures of the present disclosure can be made using conventional simple bubble or cast extrusion techniques as well as by using more elaborate techniques such as "tenter framing" or the "double bubble" or "trapped bubble" process. "Stretched" and "oriented" are used in the art and herein interchangeably, although orientation is actually the consequence of a film being stretched by, for example, internal air pressure pushing on the tube or by a tenter frame pulling on the edges of the film.

Simple blown bubble film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference.

As disclosed by Pahlke in U.S. Pat. No. 3,456,044 and in comparison to the simple bubble method, "double bubble" or "trapped bubble" film processing can significantly increase a film's orientation in both the machine and transverse directions. The increased orientation yields higher free shrinkage values when the film is subsequently heated. Also, Pahlke in U.S. Pat. No. 3,456,044 and Lustig et al. in U.S. Pat. No. 5,059,481 (incorporated herein by reference) disclose that low density polyethylene and ultra low density polyethylene materials, respectively, exhibit poor machine and transverse shrink properties when fabricated by the simple bubble method, e.g., about 3% free shrinkage in both directions. However, in contrast to known film materials, and particularly in contrast to those disclosed by Lustig et al. in U.S. Pat. Nos. 5,059,481; 4,976,898; and 4,863,769, as well as in contrast to those disclosed by Smith in U.S. Pat. No. 5,032,463 (the disclosures of which are incorporated herein by reference), the unique substantially linear ethylene polymers of the present disclosure show significantly improved simple bubble shrink characteristics in both the machine and transverse directions.

Blow-up ratios used in forming the heat-shrinkable, biaxially stretched, multilayer thermoplastic film of the present disclosure can be from 2:1 to 10:1. As appreciated by one skilled in the art, the blow-up ratio is calculated by the equation Bubble diameter divided by die diameter.

Additives, such as antioxidants (e.g., hindered phenolics, such as IRGANOX™ 1010 or IRGANOX™ 1076 supplied by BASF), phosphites (e.g., IRGAFOS™ 168 also supplied by BASF), cling additives (e.g., PIB), SANDOSTAB PEPQ™ (supplied by Sandoz), pigments, colorants, fillers, and the like may also be included in the heat-shrinkable, biaxially stretched, multilayer thermoplastic film of the present disclosure. Although generally not required, the multilayer thermoplastic film of the present disclosure may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the anti-static characteristics of the multilayer thermoplastic film of the disclosure and permit the use of the inventive shrink film in, for example, the heavy-duty packaging of electronically sensitive goods.

The multilayer thermoplastic film of the disclosure may further include recycled and scrap materials and diluent polymers, to the extent that the improved shrink film properties discovered by the Applicants is not adversely affected. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

The multilayer thermoplastic film of the disclosure are useful for their enhanced strength, barrier and/or shrink properties. The multilayer thermoplastic film of the disclosure may find utility in various packaging and storage applications for non-foodstuffs and food items such as primal and subprimal cuts of meat, ham, poultry, bacon, cheese, etc. Preferably, the multilayer thermoplastic film is suitable for use in packaging food articles.

The present disclosure also provides for a method of forming a heat-shrinkable, biaxially stretched, multilayer thermoplastic film suitable for use in fabricating bags for packaging food articles. The method includes forming a first extruded bubble with a polyethylene based plastomer having a density of 0.890 g/cm$^3$ to 0.910 g/cm$^3$ as determined in accordance with ASTM D-792 and a melt index (MI) as measured by ASTM D-1238, Condition 190° C./2.16 kg, from 0.5 g/10 minutes to 1.5 g/10 minutes, where the polyethylene based plastomera logM$_{25\%}$ of an upper 25% of a GPC quadrant having a value of 5.1 to 5.7, an intermediate molecular weight distribution (Mw/Mn) of 2.5 to 3, and a Mz/Mw value from 2 to 2.5. The composition is further characterized by Comonomer Distribution Constant value from 60 to 400 and a single SCBD peak between 40-85° C. with a mass fraction of less than 3% above 85° C. as determined by CEF, and a ZSVR value from 1.0 to 5.5; collapsing the first extruded bubble to form a first multilayer structure; passing the first multilayer structure through a first water bath having a temperature of 5° C. to 50° C. to cool the first multilayer structure, wherein the first multilayer structure has a residence time of 0.5 to 50 seconds in the water of the first water bath; passing the first multilayer structure through a second water bath having a temperature of 80° C. to 100° C. to warm the first multilayer structure coming from the first water bath, wherein the first multilayer structure has a residence time of 5 to 50 seconds in the water of the second water bath; heating the first multilayer structure to a temperature of 60° C. to 120° C.; forming a second extruded bubble with the first multilayer structure heated to the temperature of 60° C. to 120° C., wherein the first multilayer structure has a blow-up ratio from 2:1 to 10:1 in forming the second extruded bubble; and collapsing the second extruded bubble to form the heat-shrinkable, biaxially stretched, multilayer thermoplastic film.

Definitions

Density values recited in the present disclosure are determined in accordance with ASTM D-792 and are reported as grams/cubic centimeter (g/cm$^3$).

The melt index (MI) values recited in the present disclosure are determined in accordance with ASTM D-1238, Condition 190° C./2.16 kg, which is known as $I_2$. Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg, which is known as $I_{10}$.

The term "melt flow ratio" as defined herein in the conventional sense as the ratio of a higher weight melt index determination to a lower weight melt index determination. For measured $I_{10}$ and $I_2$ melt index values, the melt flow ratio is conveniently designated as $I_{10}/I_2$.

The term "composition," as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be affected by physically mixing the two or more polymers on the macro level (for example, melt blending resins or compounding) or the micro level (for example, simultaneous forming within the same reactor).

The term "linear" refers to polymers where the polymer backbone of the polymer lacks measurable or demonstrable long chain branches, for example, the polymer can be substituted with an average of less than 0.01 long branch per 1000 carbons.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined. The terms "ethylene/α-olefin polymer" is indicative of interpolymers as described.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

"Stretched" and "oriented" are used in the art and herein interchangeably, although orientation is actually the consequence of a film being stretched by, for example, internal air pressure pushing on the tube or by a tenter frame pulling on the edges of the film.

Shrink temperatures in the range of from about 40 to about 140° C., especially from about 50 to about 125° C., and more especially from about 60 to about 110° C. are suitable in the present disclosure.

The term "residual crystallinity" is used herein to refer the crystallinity of a polymer film at a particular stretching temperature. Residual crystallinity is determined using a Perkin-Elmer DSC 7 set for a first heat at 10° C./min of a water-quenched, compression molded film sample of the polymer. The residual crystallinity for an interpolymer at a particular temperature is determined by measuring heat of fusion between that temperature and the temperature of complete melting using a partial area technique and by dividing the heat of fusion by 292 Joules/gram. The heat of fusion is determined by computer integration of the partial area using Perkin-Elmer PC Series Software Version 3.1.

The term "shrink control layer" is used herein to refer to the film layer that provides or controls the shrink response. Such a layer is inherent to all heat shrink films. In a monolayer heat shrink film, the shrink control layer will be the film itself. In a multilayer heat shrink film, the shrink control layer is typically the core or an inside film layer and is typically the thickest film layer. See, for example, WO 95/08441.

The term "substantially unoriented form" is used herein in reference the fact that some amount of orientation is usually imparted to a film during ordinary fabrication. As such, it is meant that the fabrication step, in itself, is not used to impart the degree of orientation required for the desired or required shrink response. The present disclosure is thought to be generally applicable to operations where the fabrication and orientation steps are separable and occur simultaneously. However, the present disclosure is preferably directed to an additional and separate orientation step which is required beyond the making of tube, sock, web or layflat sheet whether or not such is soft, molten, or irradiated before substantial orientation is imparted.

The following examples are provided for the purpose of explanation and are not intended to suggest any particular limitation of the present disclosure.

EXAMPLES

Prepare the following "Original Structure" and "Inventive Structure" using a double bubble or trapped bubble process generally utilizing the apparatus seen in FIG. 1 and in further accordance with the detailed description above. In FIG. 1, the element number represent the following elements of the apparatus: 100—Extruder; 102—Tape; 104—Water Bath (90° C.); 106—Heater; 108—Stretching Process. In the following examples, all layers were extruded (coextruded in the multilayer examples) as a primary tube which was cooled upon exiting the die e.g. using a cold-water fountain (10-20° C.). This primary tube was then reheated in a warm-water bath (90° C.) and then by radiant heaters (60 to 120° C.) to the draw (orientation) temperature for biaxial orientation accomplished by an air cushion which was itself heated by transverse flow through a heated porous tube concentrically positioned around the moving primary tube. Cooling was accomplished by means of a concentric air ring. Draw point temperature, bubble heating and cooling rates and orientation ratios were generally adjusted to maximize bubble stability and throughput for the desired amount of stretching or orientation. All percentages are by weight unless indicated otherwise.

The "Original Structure" was produced having the following "A/B/C" multilayer structure, where the weight percent of each layer are 40%/30%/30%, respectively. The A layer (the inside layer) is formed from a 70%/30% blend of Affinity™ PL 1880G (The Dow Chemical Company) and Attane™ 4203G (The Dow Chemical Company), respectively. Layer B is formed from Elvax® 470 (Dupont). Layer C is formed from Affinity™ PL1880G (The Dow Chemical Company) and serves as a puncture resistant layer.

The "Inventive Structure" was produced having the following "A/B/C" multilayer structure, where the weight percent of each layer are 40%/30%/30%, respectively. The A layer (the inside layer) is formed from a 70%/30% blend of Affinity™ PL 1880G (The Dow Chemical Company) and Attane™ 4203G (The Dow Chemical Company), respectively. Layer B is formed from Elvax® 470 (Dupont). Layer C is formed from Affinity™ PL1860G (The Dow Chemical Company) and serves as an example of the puncture resistant layer of the present disclosure.

The physical properties of the above recited materials are seen in Table 1

TABLE 1

| Resin | $I_2$ (g/10 min, 190° C. 2.16 kg) | D (g/cm3) |
| --- | --- | --- |
| Elvax 470 (18% VA) | 0.7 | 0.941 |
| Affinity ™ PL 1880G | 1.0 | 0.902 |
| Affinity ™ PL 1860G | 0.8 | 0.905 |
| Attane ™ 4203 G | 0.8 | 0.905 |

Conventional Gel Permeation Chromatography (GPC)

The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 3 Agilent "Mixed B" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad (EQ1)$$

where M is the molecular weight, A has a value of 0.4315 and B is equal to 1.0.

A polynomial between $3^{rd}$ and $5^{th}$ order was used to fit the respective polyethylene-equivalent calibration points. A small adjustment to A (from approximately 0.415 to 0.44)

was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate count} = 5.54 * \left(\frac{(RV_{PeakMax})}{\text{Peak Width at } \frac{1}{2} \text{ height}}\right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ3)$$

where RV is the retention volume in milliliters and the peak width is in milliliters, Peak max is the maximum position of the peak, one tenth height is ⅒ height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre-nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})} \quad (EQ4)$$

$$Mw_{(GPC)} = \frac{\sum_i (IR_i * M_{polyethylene_i})}{\sum_i IR_i} \quad (EQ5)$$

$$Mz_{(GPC)} = \frac{\sum_i (IR_i * M^2_{polyethylene_i})}{\sum_i (IR_i * M_{polyethylene_i})} \quad (EQ6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate(effective)} = \text{Flowrate(nominal)} * (RV(FM\ Calibrated)/RV(FM\ Sample)) \quad (EQ7)$$

Calculation of Quadrants from MWD by GPC

The chromatographic system, run conditions, column set, column calibration and calculation conventional molecular weight moments and the distribution were performed according to the method described in Gel Permeation Chromatography (GPC).

The molecular weight distribution from GPC as plotted (dWf/dLogM vs LogM) by definition has an area equivalent to 1. This plot was divided into four equivalent area sections (weight fraction=0.25) integrating from high molecular weight to low molecular weight. The average logM was determined for each quadrant (25%, 50%, 75%, 100%) as follows in Equation 8A-8D:

$$\text{Log } M_{25\%} = \frac{\sum_{highestLogMW}^{Area=0.25} (IR_i * \text{Log } Mgpc_i)}{\sum_{HighestLogMw}^{Area=0.25} (IR_i)} \quad (EQ8A)$$

$$\text{Log } M_{50\%} = \frac{\sum_{Area=0.25}^{Area=0.50} (IR_i * \text{Log } Mgpc_i)}{\sum_{Area=0.25}^{Area=0.50} (IR_i)} \quad (EQ8B)$$

$$\text{Log } M_{75\%} = \frac{\sum_{Area=0.50}^{Area=0.75} (IR_i * \text{Log } Mgpc_i)}{\sum_{Area=0.50}^{Area=0.75} (IR_i)} \quad (EQ8C)$$

$$\text{Log } M_{100\%} = \frac{\sum_{Area=0.75}^{lowestLogMw} (IR_i * \text{Log } Mgpc_i)}{\sum_{Area=0.75}^{lowestLogMw} (IR_i)} \quad (EQ8D)$$

Wherein the MWD area is integrated at each dWf/dLogM from the highest detectable logMw to the lowest detectable logMw, and each slice (i) represents 0.01 LogMw in width. The average GPC molecular weight for each quadrant is calculated as: $10^{\wedge}LogM_{Quadrant}$ and this value will be different than the mathematical average obtained by taking the average of $10^{\wedge}LogMi$ at each slice (i) within the quadrant.

Figure 2:
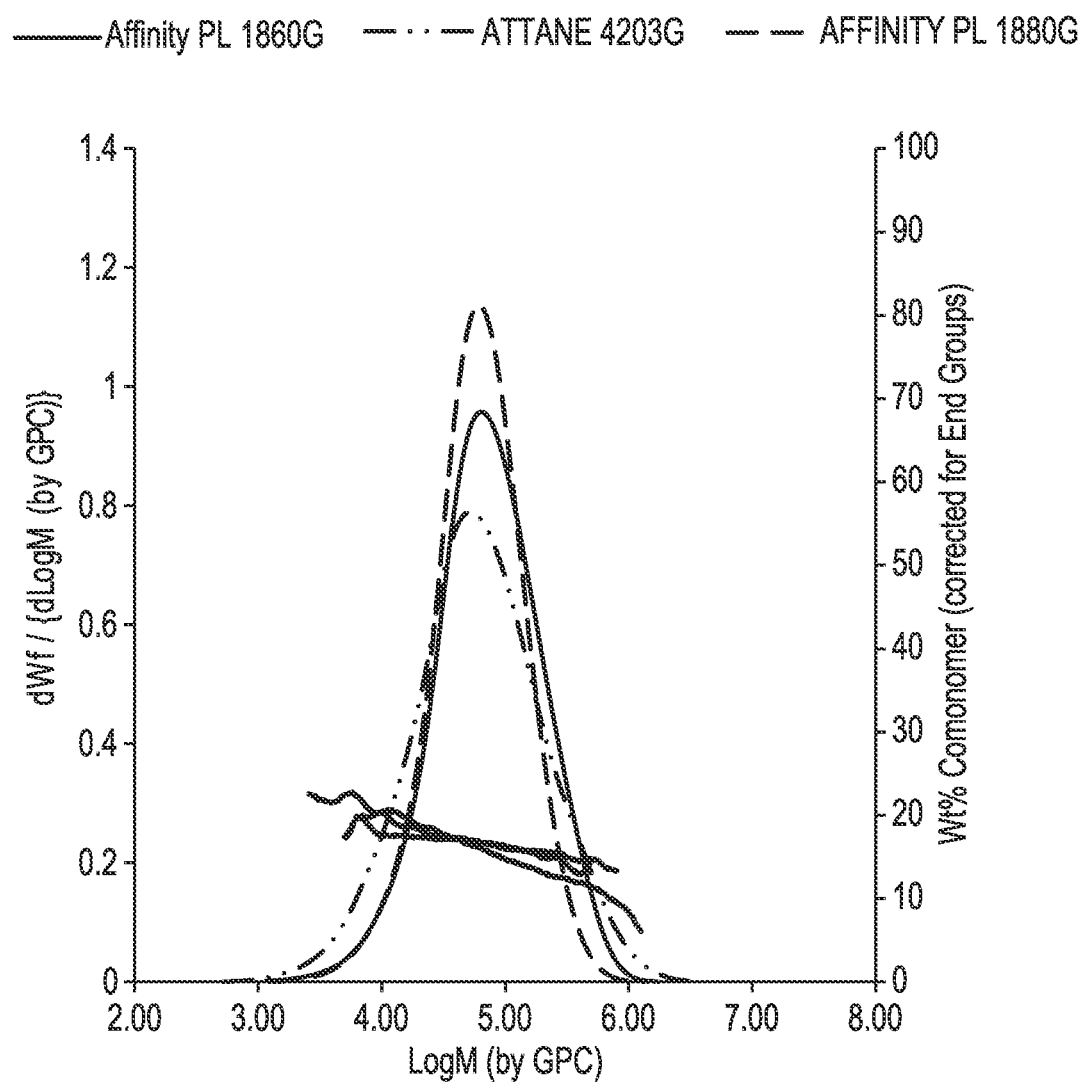
FIG. 2 is a graph of gel permeation chromatography results for intermediate molecular weight distribution for Affinity™ PL 1880G; Affinity™ PL 1860G and Attane™ 4203G.

The following GPC graph (FIG. 2) shows an intermediate molecular weight distribution for Affinity™ PL 1880G; Affinity™ PL 1860G and Attane™ 4203G. Looking at average molecular weight numbers for the grades, it can be noticed that comparing Affinity™ PL 1880G and Affinity™ PL 1860G, the main difference is found at Mz, impacted by high molecular weight fraction present in the last resin.

TABLE 2

Average Molecular Weight numbers and GPC Quadrant Anslysis for different high puncture alternatives

| | Conventional GPC | | | |
|---|---|---|---|---|
| Identification | Mn | Mw | Mz | Mw/Mn |
| Affinity PL 1860G | 41,960 | 113,358 | 246,871 | 2.70 |
| ATTANE 4203G | 27,360 | 122,696 | 425,428 | 4.48 |
| AFFINITY PL 1880G | 40,110 | 85,287 | 161,506 | 2.13 |

| GPC Quadrant Analysis | | | |
|---|---|---|---|
| | Affinity PL 1860G (Inventive) | ATTANE 4203G | AFFINITY PL 1880G |
| 25% | 251083.1 | 286241 | 175530.8 |
| 50% | 100745.9 | 88279.13 | 81289.54 |
| 75% | 53585.91 | 40885.38 | 47868.04 |
| 100% | 20323.64 | 12539.01 | 20050.47 |

One extruder was used for each layer. Each extruder was connected to an annular coextrusion die from which heat plastified resins were coextruded forming a primary tube. The resin mixture for each layer was fed from a hopper into an attached single screw extruder where the mixture was heat plastified and extruded through a three-layer coextrusion die into the primary tube. The extruder barrel temperature for layer B was between about 120-150° C.; for the layer A and for layer C were about 140-165° C. The coextrusion die temperature profile was set from about 160 to 180° C. Processing conditions were taken using 100 kg/hr; initial thickness 500 microns; final Thickness 70 microns where the material temperature before second bubble stretching is 116° C.

The following puncture tests we performed to assess the advantages of using the puncture resistant layer of the present disclosure, in this case Affinity™ PL 1860G. ASTM F1306.90—Sharp Edge Puncture and round puncture test using a Dow method.

| Puncture specifications | |
|---|---|
| Test Name | Puncture @ TGN TS&D |
| Minimum sample amount | 300 mm (width) × 3000 mm (length) |
| Specimen dimensions | 150 mm × 150 mm |
| Probe dimensions | 12.7 mm diameter |
| Pneumatic clamp dimension | 102 mm diameter |
| Test speed | 250 mm/min |
| Load cell required | 1 kN |
| Reported values | Thickness (μm) |
| | Puncture force (N) |
| | Puncture elongation (mm) |
| | Puncture energy (J) |
| | Puncture resistance (J/cm3) |

The Inventive Structure was found to have improved puncture force and puncture energy as compared to the Original Structure.

We claim:

1. A heat-shrinkable, biaxially stretched, multilayer thermoplastic film, the multilayer thermoplastic film comprising at least a puncture resistant layer formed with a polyethylene based plastomer having a density of 0.890 g/cm$^3$ to 0.910 g/cm$^3$ as determined in accordance with ASTM D-792 and a melt index (MI) measured at 190° C./2.16 kg from 0.20 g/10 minutes to 1.5 g/10 minutes as measured by ASTM D-1238, wherein the polyethylene based plastomer has:

a logM$_{25}$% of an upper 25% of a GPC quadrant having a value of 5.1 to 5.7;
an intermediate molecular weight distribution (Mw/Mn) of 2.5 to 3 and a Mz/Mw value of 2 to 2.5;
a Comonomer Distribution Constant value from 60 to 400 and a single SCBD peak between 40-85° C. with a mass fraction of less than 3% above 85° C. as determined by CEF; and
a ZSVR value from 1.0 to 5.5;
the multilayer thermoplastic film being biaxially stretched at a temperature of 60° C. to 120° C. with a blow-up ratio from 2:1 to 10:1.

2. The multilayer thermoplastic film of claim 1, wherein the polyethylene based plastomer has a melt index (MI) as measured by ASTM D-1238, Condition 190° C./2.16 kg, from 0.75 g/10 minutes to 1 g/10 minutes.

3. The multilayer thermoplastic film of claim 1, wherein the polyethylene based plastomer has a density of 0.900 g/cm$^3$ to 0.910 g/cm$^3$ as determined in accordance with ASTM D-792.

4. The multilayer thermoplastic film of claim 1, wherein the puncture resistant layer further comprises 5 weight percent to 50 weight percent of an ethylene/vinyl acetate copolymer based on the weight of the blend.

5. The multilayer thermoplastic film of claim 1, wherein the polyethylene based plastomer of the puncture resistant layer is blended with 5 weight percent to 50 weight percent of heterogeneously branched ultra-low density polyethylene or heterogeneously branched very-low density polyethylene based on the weight of the blend.

6. The multilayer thermoplastic film of claim 1, wherein the polyethylene based plastomer of the puncture resistant layer is an ethylene interpolymer with at least one α-olefin of 3 to 20 carbon atoms.

7. The multilayer thermoplastic film of claim 1, wherein the polyethylene based plastomer of the puncture resistant layer is an ethylene/α-olefin copolymer.

8. The multilayer thermoplastic film of claim 7, wherein the ethylene/α-olefin copolymer is an ethylene/1-octene copolymer.

9. The multilayer thermoplastic film of claim 1, wherein the multilayer thermoplastic film further includes a second polymeric layer adjacent the puncture resistant layer, wherein the puncture resistant layer and the second polymeric layer of the multilayer thermoplastic film are biaxially stretched at a temperature of 60° C. to 120° C. with a blow-up ratio from 2:1 to 10:1.

10. The multilayer thermoplastic film of claim 9, wherein the second polymeric layer is formed of a polymer selected from the group consisting of an ultra-low density polyethylene, a very-low density polyethylene, an ethylene/α-olefin interpolymer, an ethylene-vinyl acetate copolymer, a polyamide, a copolymer of polyvinylidene chloride, ethylene vinyl alcohol or a linear low-density polyethylene-grafted-maleic anhydride.

11. The multilayer thermoplastic film of claim 9, wherein the multilayer thermoplastic film further includes a third polymeric layer positioned between the puncture resistant layer and the second polymeric layer, wherein the puncture resistant layer, the second polymeric layer and the third polymeric layer of the multilayer thermoplastic film are biaxially stretched at a temperature of 60° C. to 120° C. with a blow-up ratio from 2:1 to 10:1.

12. The multilayer thermoplastic film of claim 9, wherein the second polymeric layer and the third polymeric layer are independently formed of a polymer selected from the group consisting of an ultra-low density polyethylene, a very-low density polyethylene, an ethylene/α-olefin interpolymer, an ethylene-vinyl acetate copolymer, a polyamide, a copolymer of polyvinylidene chloride, ethylene vinyl alcohol or a linear low-density polyethylene-grafted-maleic anhydride.

13. The multilayer thermoplastic film of claim 12, wherein the polymer of the second polymeric layer is a structurally different polymer than the polymer of the third polymeric layer.

14. The multilayer thermoplastic film of claim 12, wherein the third polymeric layer is an ethylene-vinyl acetate copolymer and the second polymeric layer comprises an ethylene/α-olefin interpolymer and an ultra-low density polyethylene.

15. The multilayer thermoplastic film of claim 1, wherein the biaxial-oriented polymeric film further includes a barrier polymeric layer and tie layers adjacent the puncture resistant layer, wherein the puncture resistant layer and set of barrier and tie layers of the biaxial-oriented polymer film are biaxially stretched at a temperature of 60° C. to 120° C. with a blow-up ratio from 2:1 to 10:1.

16. The multilayer thermoplastic film of claim 1, wherein the multilayer thermoplastic film is prepared by a double-bubble process.

17. The multilayer thermoplastic film of claim 1, wherein the multilayer thermoplastic film is suitable for use in packaging food articles.

18. The multilayer thermoplastic film of claim 1, wherein the polyethylene based plastomer has a $\log M_{25}\%$ of an upper 25% of a GPC quadrant having a value of 5.2 to 5.6.

19. A method of forming a heat-shrinkable, biaxially stretched, multilayer thermoplastic film suitable for use in fabricating bags for packaging food articles, the method comprising:

forming a first extruded bubble with a polyethylene based plastomer having a density of 0.890 g/cm³ to 0.910 g/cm³ as determined in accordance with ASTM D-792 and a melt index (MI) as measured by ASTM D-1238, Condition 190° C./2.16 kg, from 0.20 g/10 minutes to 1.5 g/10 minutes, wherein the polyethylene based plastomer has:

a $\log M_{25}\%$ of an upper 25% of a GPC quadrant having a value of 5.1 to 5.7;

an intermediate molecular weight distribution (Mw/Mn) of 2.5 to 3 and a Mz/Mw value of 2 to 2.5;

a Comonomer Distribution Constant value from 60 to 400 and a single SCBD peak between 40-85° C. with a mass fraction of less than 3% above 85° C. as determined by CEF; and a ZSVR value from 1.0 to 5.5;

collapsing the first extruded bubble to form a first multilayer structure;

passing the first multilayer structure through a first water bath having a temperature of 5° C. to 50° C. to cool the first multilayer structure, wherein the first multilayer structure has a residence time of 0.5 to 50 seconds in the water of the first water bath;

passing the first multilayer structure through a second water bath having a temperature of 80° C. to 100° C. to warm the first multilayer structure coming from the first water bath, wherein the first multilayer structure has a residence time of 5 to 50 seconds in the water of the second water bath;

heating the first multilayer structure to a temperature of 60° C. to 120° C.;

forming a second extruded bubble with the first multilayer structure heated to the temperature of 60° C. to 120° C., wherein the first multilayer structure has a blow-up ratio from 2:1 to 10:1 in forming the second extruded bubble; and collapsing the second extruded bubble to form the heat-shrinkable, biaxially stretched, multilayer thermoplastic film.

* * * * *